May 5, 1970   R. A. BRIONES   3,510,798

HOLOCAMERA ILLUMINATOR

Filed May 16, 1967

Robert A. Briones,
INVENTOR.

BY.

*Edward Dugas*

AGENT.

United States Patent Office 3,510,798
Patented May 5, 1970

3,510,798
HOLOCAMERA ILLUMINATOR
Robert A. Briones, Granada Hills, Calif., assignor to TRW Inc., Redondo Beach, Calif., a corporation of Ohio
Filed May 16, 1967, Ser. No. 638,936
Int. Cl. H01s 3/00
U.S. Cl. 331—94.5
5 Claims

ABSTRACT OF THE DISCLOSURE

Two separate laser beams having identical characteristics are created by folding a long laser cavity and using a partially transparent common reflector at the point of the fold. Separate beams then emanate from the partial reflector at an angle of separation substantially equivalent to that of the angle of the fold of the cavity.

BACKGROUND OF THE INVENTION

The holographic process of recording events is generally done by two major techniques. One of these techniques is the single-beam technique, which is not related to the present invention. The other technique is the two-beam holographic technique in which a scene and a reference beam fall upon a photographic plate at angles to one another. With the two-beam arrangement, temporal and spatial matching of interfering waves is of primary importance. For these reasons, a coherent light source is generally used with the beam of light from the source being split into the reference and scene beams by means of a beam splitter. Utilization of the beam splitter ensures that the two beams will be identical, to an acceptable degree, when received at the photographic plate. A beam splitter does not ensure equal splitting of the beam with respect to energy content. The folded cavity configuration provides the advantages of the long-cavity-type laser in a much smaller space, thereby decreasing the energy density which, in turn, increases the life of the optical components used in and with the cavity. Another advantage of the long laser cavity is that off-axis lasing is minimized. It is therefore highly desirable to have a device for providing two substantially identical beams from a single source of coherent light without the use of a beam splitter.

SUMMARY OF THE INVENTION

This invention relates generally to holographic apparatus and more particularly relates to a device for providing the reference and scene beams used in two-beam holography processes. In the preferred embodiment of the present invention, two substantially identical coherent beams are generated by folding a laser cavity and positioning at the point of the fold a partially transparent reflector which allows part of the energy created within each one of the cavities to pass out of the cavity area in beam form. Each beam being separated from the other by an angle substantially equal to the angle of the folded cavity.

Accordingly, it is a primary object of the present invention to provide a dual beam from a single beam.

It is a further object of the present invention to provide a novel means of separating optical beams.

It is a further object of the present invention to provide a means of separating a single beam into two beams of equal energy content.

The foregoing and other objects and features of the present invention will become apparent and better understood when taken with the following description and the accompanying drawings, throughout which like characters indicate like parts, and which drawings form a part of this application.

DESCRIPTION OF THE PREFERRED EMBODIMENTS

Figure 1:
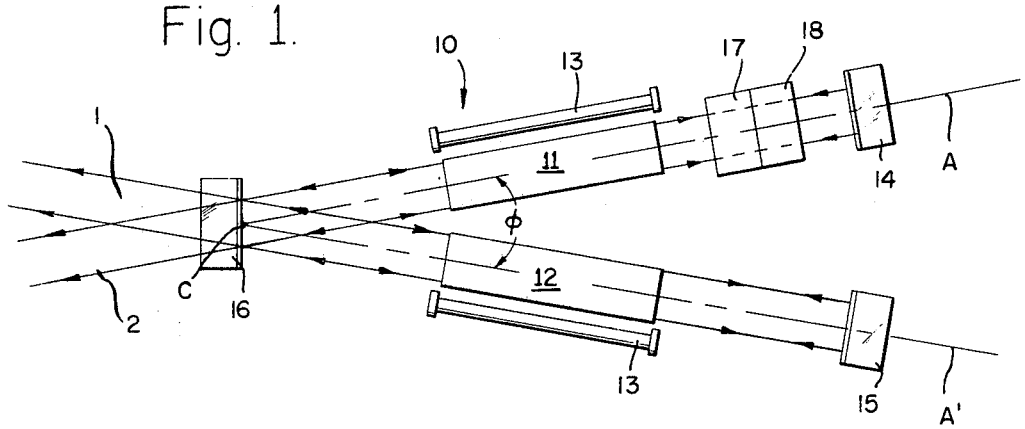
FIG. 1 illustrates in block diagram form a preferred embodiment of the invention.

Referring now to FIG. 1, a laser cavity 10 is folded about a point C, forming a first and second arm with the optic axis of the laser, A–A′, folded back upon itself and separated by an angle $\theta$. A solid state laser element 11 is positioned in the first arm between a totally reflecting mirror 14 and a partial reflector 16 with the optic axis of the laser element corresponding to the optic axis A–A′ of the laser cavity. A solid state laser element 12 is positioned in the second arm between the totally reflecting mirror 15 and the partially reflecting mirror 16, with its optical axis aligned along the optic axis A–A′ of the laser cavity. The laser elements 11 and 12 are optically pumped by suitable light sources 13, such as xenon flash tubes or mercury discharge lamps in order to excite the atoms of the laser element sufficiently in order to produce a suitable output pulse. A Kerr cell 18 and Glan polarizer 17 are positioned interposed in the laser cavity between the laser element 11 and the reflector 17. The laser is Q-switched by means of the Kerr cell 16 and the Glan polarizer 17. A Pockels cell or bleachable shutters may be substituted for the Kerr cell. The Q-switching of lasers is well-known in the prior art and will not be discussed as part of this invention.

With the cavity at an angle $\theta$, two distinct beams, beam 1 and beam 2, will emerge from the partial reflector 16. Each of the beams is emerged at equal intensities and essentially from the same source point. The partial reflector 16 should be a partial reflector at the angle $\theta$, the angle at which the laser cavity is folded. One of the properties of dielectric mirrors is that they change their reflectivity as a function of the square of the angle. The reflector therefore must be specifically made for that angle. The amount of reflectivity that reflector 16 must display or, in order words, the amount of energy that can be removed from the cavity is determined by the gain of the material used for the laser elements, the mode of operation (Q-switching or normal lasing), and the amount of energy necessary to maintain its lasing action.

Figure 2:
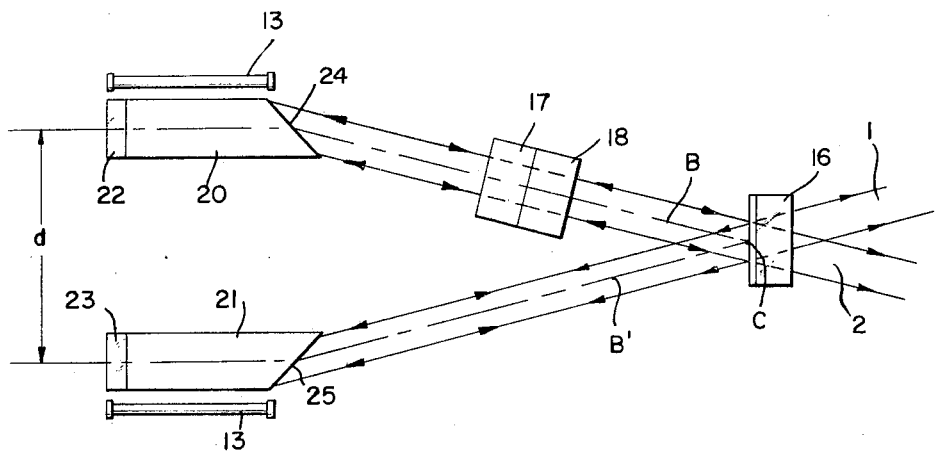
FIG. 2 is a block diagram illustrating a second embodiment of the present invention.

Referring now to FIG. 2, the solid state laser elements 20 and 21 are positioned apart from each other with their optical axes substantially parallel. A total reflector 22 is deposited on the end of the laser element or is placed adjacent with the end of the laser element 20 to form one of the reflectors for the laser cavity. Another reflector 23 is attached in a similar manner to the end of laser element 21. The opposite end of laser elements 20 and 21 are cut at the Brewster angle corresponding to the particular type of material used for the laser elements. The light emerging from each of the laser elements is bent a fixed number of degrees corresponding to the surface angle of the elements. A partially reflecting reflector 16 is positioned so as to reflect the beam from laser element 20 to laser element 21 and vice-versa. Reflector 16 is partially transparent; therefore, a portion of the energy transmitted to reflector 16 along optic axis B and B′ emerges from the mirror to form two beams.

A Q-switching means comprised of a Glan polarizer 17 and a Kerr cell or Pockel cell is inserted into the beam path of laser element 20 between the laser element and the partial reflector 16 to Q-switch the entire laser cavity. Suitable light sources 13 are positioned adjacent laser element 20 and 21 in order to excite the atoms of the laser element sufficiently to produce a suitable light output. The pumping of laser elements with light source is well known in the prior art and will not be discussed herein.

In both the embodiments of FIG. 1 and FIG. 2, it is also possible to make the partial reflector 16 totally reflective and make the total reflectors (14 and 15 in FIG. 1 and the total reflectors 22 and 23 in FIG. 2) partially reflective to achieve beam emergence from these reflectors and thereby accomplish substantially the same results as would be achieved by having the reflector 16 partially reflecting.

While there has been shown what are considered to be the preferred embodiments of the invention, it will be manifest that many changes and modifications may be made therein without departing from the essential spirit of the invention. It is intended, therefore, in the annexed claims, to cover all such changes and modifications that fall within the true scope of the invention.

What is claimed is:

1. Laser beam source comprising in combination:
a folded laser cavity having a first and second arm with total reflectors positioned on the two non-common ends thereof;
a partially reflecting reflector placed at the fold point of said cavity;
a laser element interposed in one of said arms;
a light source optically pumping said laser element to produce an output beam; and
means interposed in said laser cavity of Q-switching said laser element.

2. A laser source for developing two separate laser beams forming an angle with each other comprising:
(a) a folded resonant laser cavity having a first and a second arm extending at an angle to each other to form a fold point;
(b) reflectors disposed at the non-common ends and at the fold point of said cavity, one of said reflectors being partially reflective, while the others are totally reflective;
(c) a laser element disposed in one of the arms of said folded cavity;
(d) a light source for optically pumping said laser element to produce two output beams at said partially reflective reflector extending at an angle to each other; and
(e) means disposed in said laser cavity for Q-switching said laser element.

3. A laser source as defined in claim 2 wherein a second laser element is disposed in the other arm of said folded cavity and another light source for optically pumping said second laser element.

4. A laser source as defined in claim 3 wherein the single partially reflective reflector is provided and is disposed at the fold point of said cavity.

5. A laser source as defined in claim 3 wherein said laser elements each have one surface angled at the Brewster angle of the laser material, said Brewster-angle surfaces facing the fold point of said converter.

References Cited
UNITED STATES PATENTS

| | | | |
|---|---|---|---|
| 3,389,348 | 6/1968 | De Maria | 331—94.5 |
| 3,416,097 | 12/1968 | Simpson | 331—94.5 |

RONALD L. WIBERT, Primary Examiner

P. K. GODWIN, JR., Assistant Examiner

U.S. Cl. X.R.

350—3.5